…

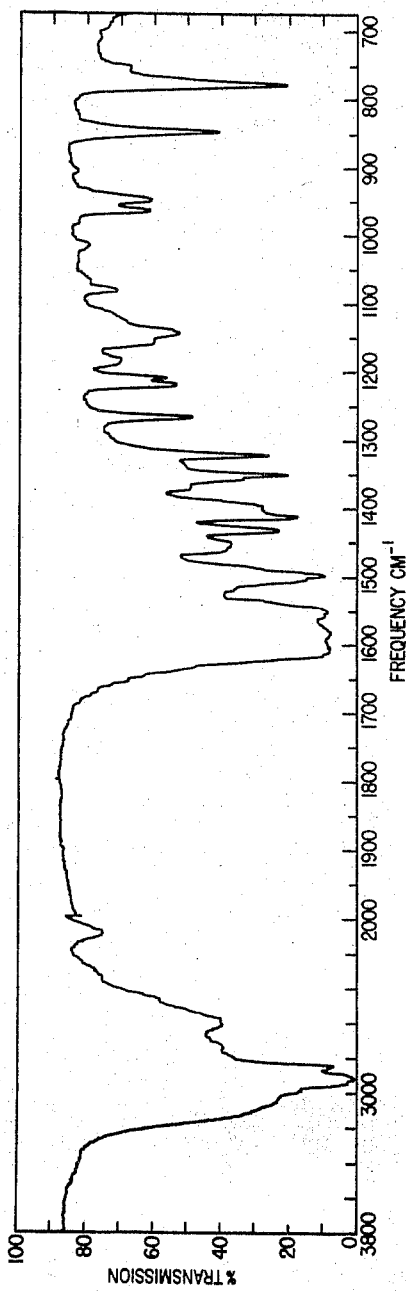

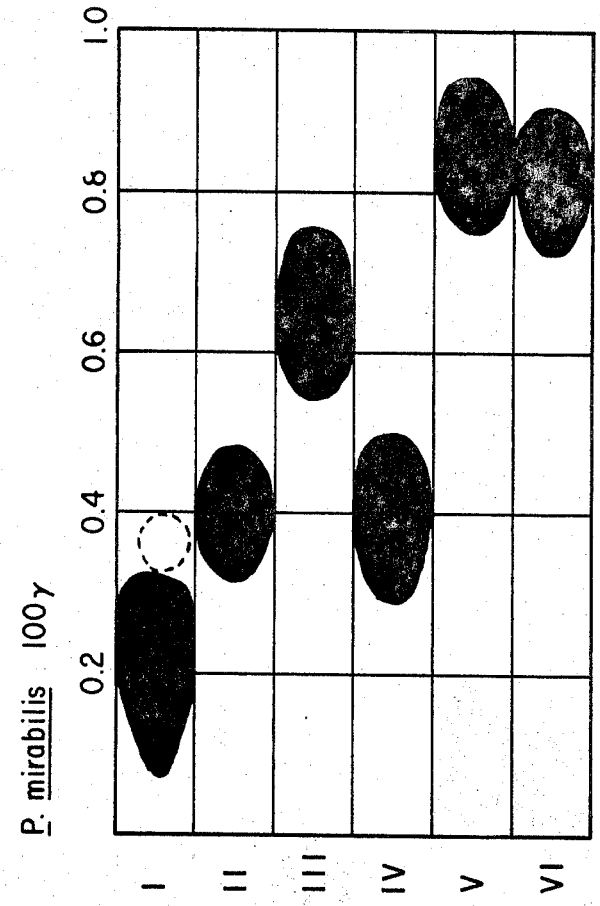

3,342,681
ANTIBIOTIC ARMENTOMYCIN AND A PROCESS FOR PRODUCING THE SAME

Alexander D. Argoudelis and Ross R. Herr, Kalamazoo, and Donald J. Mason, Portage, Mich., assignors to The Upjohn Company, Kalamazoo, Mich., a corporation of Delaware
Filed Apr. 16, 1965, Ser. No. 448,611
8 Claims. (Cl. 167—65)

ABSTRACT OF THE DISCLOSURE

Antibiotic armentomycin which is produced in a microbiological fermentation using the microorganism *Streptomyces armentosus* var. *armentosus*. Armentomycin is an amphoteric substance which has the property of adversely affecting the growth of certain bacteria. Armentomycin inhibits the growth of *Salmonella gallinarum* and can be used in poultry processing plants to control infections by this microorganism.

---

This invention relates to a novel composition of matter and to a process for the production thereof. More particularly, this invention relates to a new compound, armentomycin (U–10,923), and to a process for the production thereof.

Armentomycin is a biosynthetic product produced by culturing an armentomycin-producing actinomycete in an aqueous nutrient medium. It is an amphoteric substance which has the property of adversely affecting the growth of certain organisms, particularly bacteria, for example, *Pseudomonas aeruginosa*, *Proteus vulgaris*, *Proteus mirabilis*, *Salmonella gallinarum*, *Proteus rettgeri*, and *Escherichia coli*, and can be used alone or in combination with other antibacterial agents to prevent the growth of, or reduce the number of, such organisms present in various environments. For example, it can be used in paper mill systems to inhibit the growth of *Aerobacter aerogenes* which is known to produce slime in such systems. It is also useful as an oil preservative, for example, as a bacteriostatic agent for inhibiting the growth of *Proteus vulgaris* which is known to cause spoilage in cutting oils. Also, it is useful in wash solutions for sanitation purposes, as in the washing of hands and the cleaning of equipment, floors, or furnishings of contaminated rooms or laboratories; it is also useful as an industrial preservative, for example, as a bacteriostatic rinse for laundered clothes and for impregnating paper and fabrics; and it is useful for suppressing the growth of sensitive organisms in plate assays and other biological media. It can also be used as a feed supplement to promote the growth of animals, for example, mammals, birds, fish, and reptiles.

The microorganism

The actinomycete used according to this invention for the production of armentomycin has been designated as *S. armentosus* var. *armentosus* nov. sp. One of its strain characteristics is the production of armentomycin. A subculture of the living organism can be obtained from the permanent collection of the Northern Utilization and Research Division, Agricultural Research Service, U.S. Department of Agriculture, Peoria, Ill., U.S.A. Its accession number in this repository is NRRL 3176.

The characteristics of *Streptomyces armentosus* var. *armentosus* nov. sp., NRRL 3176, are given in the following tables:

Table I.—Appearance on Ektachrome
Table II.—Microscopic Characteristics
Table III.—Assimilation of Carbon Compounds in Synthetic Medium (J. Bact. 56:107–114, 1948)
Table IV.—Cultural Characteristics
Table V.—Color—According to the Color Harmony Manual, 3rd ed., 1948, and the ISCC–NBS Method of Designating Colors and a Dictionary of Color Names, NBS Circular 553.

TABLE I.—APPEARANCE OF *STREPTOMYCES ARMENTOSUS* VAR. *ARMENTOSUS* NOV. SP. ON EKTACHROME

| Agar Medium | Surface | Reverse |
| --- | --- | --- |
| Bennett's | Salmon-pink | Yellow-tan. |
| Czapek's Sucrose | Pale pink | Colorless to pale pink. |
| Maltose Tryptone | Salmon-pink | Tan. |
| Peptone-Iron | Trace pink | Brown. |
| 0.1% Tyrosine | Pale pink | Pale Pink. |
| Casein Starch | Pink | Pale tan. |

TABLE II.—MICROSCOPIC CHARACTERISTICS OF *STREPTOMYCES ARMENTOSUS* VAR. *ARMENTOSUS* NOV. SP.

Light microscope: Sporophores straight, open loops and spirals, and spirals.
Electron microscope:
    Direct _____ Spores sausage-like, smooth.
    Carbon replica ___ Spores smooth with ridging and some basket-weave effect.

TABLE III.—ASSIMILATION OF CARBON COMPOUNDS IN SYNTHETIC MEDIUM (J. BACT. 56:107–114, 1948) BY *STREPTOMYCES ARMENTOSUS* VAR. *ARMENTOSUS* NOV. SP.

```
Control ------------------------------------- (+)
(1)  D-xylose ------------------------------- +
(2)  L-arabinose ---------------------------- +
(3)  Rhamnose ------------------------------- +
(4)  D-fructose ----------------------------- (+)
(5)  D-galactose ---------------------------- +
(6)  D-glucose ------------------------------ +
(7)  D-mannose ------------------------------ +
(8)  Maltose -------------------------------- +
(9)  Sucrose -------------------------------- (+)
(10) Lactose -------------------------------- (+)
(11) Cellobiose ----------------------------- +
(12) Raffinose ------------------------------ (−)
(13) Dextrin -------------------------------- +
(14) Inulin --------------------------------- (−)
(15) Soluble starch ------------------------- +
(16) Glycerol ------------------------------- +
(17) Dulcitol ------------------------------- (−)
(18) D-mannitol ----------------------------- (−)
(19) D-sorbitol ----------------------------- (−)
(20) D-inositol ----------------------------- +
(21) Salicin -------------------------------- (−)
(22) Phenol --------------------------------- (−)
(23) Cresol --------------------------------- (−)
(24) Na formate ----------------------------- (−)
(25) Na oxalate ----------------------------- (−)
(26) Na tartrate ---------------------------- (−)
(27) Na salicylate -------------------------- −
(28) Na acetate ----------------------------- −
(29) Na citrate ----------------------------- (+)
(30) Na succinate --------------------------- (+)
                                               (−)
```

+=positive assimilation
(+)=positive assimilation—slight growth
(−)=slight growth—no assimilation
−=no growth TABLE IV.—CULTURAL CHARACTERISTICS OF *STREPTOMYCES ARMENTOSUS* VAR. *ARMENTOSUS* NOV. SP.

| Medium | Surface (Aerial Growth) | Reverse | Pigment | Other |
|---|---|---|---|---|
| Peptone Iron Agar | White | Tan | Tan-brown | Melanin±. |
| Calcium Malate Agar | Good, sandlewood | Colorless | None | Malate solubilized. |
| Glucose Asparagine Agar | Gray-white | Cream | ----do---- | None. |
| Skim Milk Agar | Gray around edge | Yellow-tan | Brown-tan | Casein solubilized around growth. |
| Tyrosine Agar | White-gray | ----do---- | Tan | Tyrosine solubilized. |
| Xanthine Agar | White | Light yellow | None | Xanthine solubilized. |
| Casein Starch Agar | Pink and gray | Cream | ----do---- | Starch solubilized. |
| Tomato Paste Oatmeal Agar | White | Colorless | ----do---- | None. |
| Synthetic Nitrate Broth | ----do---- | None | ----do---- | No reduction. |
| Nutrient Nitrate Broth | Pink-white | ----do---- | ----do---- | Do. |
| Litmus Milk | None | ----do---- | Blue | Some peptonization pH 7.1. |
| Plain Gelatin | Trace white | ----do---- | Yellow-tan | Trace liquefaction. |
| Nutrient Gelatin | ----do---- | ----do---- | Yellow-tan in ⅓ of tube | Liquefaction in ⅓ of tube. |

TABLE V.—COLOR OF *STREPTOMYCES ARMENTOSUS* VAR. *ARMENTOSUS* NOV. SP. ACCORDING TO THE COLOR HARMONY MANUAL, 3RD ED., 1948 AND THE ISCC-NBS METHOD OF DESIGNATING COLORS AND A DICTIONARY OF COLOR NAMES, NBS CIRCULAR 553

| Medium | Surface | Reverse | Pigment |
|---|---|---|---|
| Bennett's | (1) 5 cb=unnamed<br>(2) | 2 gc=bamboo chamois<br>90 gm=grayish yellow | 2 gcm*=bamboo, chamois.<br>90 gm=grayish-yellow. |
| Czapek's Sucrose | (1) 5 ba=shell pink<br>(2) 9 m=pinkish white | 2 db=ivory<br>89 gm=pale yellow<br>90 g=grayish yellow<br>121 m=pale yellow-green | None.<br>None. |
| Maltose Tryptone | (1) 5 ba=shell pink<br>(2) 9 m=pinkish white | 2 gc=bamboo chamois<br>90 gm=grayish-yellow | 2 gcM=bamboo, chamois.<br>90 gm=grayish-yellow. |

*M=Mat surface of chip (all others glossy).

The new compound of the invention is produced when the elaborating organism is grown in an aqueous nutrient medium under submerged aerobic conditions. It is to be understood also that for the preparation of limited amounts surface cultures in bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, corn starch, galactose, dextrin, molasses, and the like. Preferred nitrogen sources include corn steep liquor, yeast, autolyzed brewer's yeast with milk solids, soybean meal, cottonseed meal, corn meal, milk solids, pancreatic digest of casein, distiller's solubles, fish meal, animal peptone liquors, meat and bone scraps, and the like A combination of these carbon and nitrogen sources can be used advantageously. Trace metals, for example, zinc, magnesium, manganese, cobalt, iron, and the like need not be added to the fermentation since tap water and unpurified ingredients are used as media components.

Production of the compound of the invention can be effected at any temperature conducive to satisfactory growth of the microorganism, for example, between about 18° to 40° C. and preferably between about 25° and 30° C. Ordinarily, optimum production of the compound is obtained in about 2 to 10 days. The medium normally stays fairly close to neutral, or on the acid side during the fermentation. The final pH is dependent, in part, on the buffers present, if any, and in part on the initial pH of the culture medium which is advantageously adjusted to about pH 6–8 prior to sterilization.

When growth is carried out in large vessels and tanks, it is preferable to use the vegetable form, rather than the spore form, of the microorganisms for inoculation to avoid a pronounced lag in the production of the new compound and the attendant inefficient utilization of equipment. Accordingly, it is desirable to produce a vegetative inoculum in a nutrient broth culture by inoculating the broth culture with an aliquot from a soil or slant culture. When a young, active, vegetative inoculum has thus been secured, it is transferred aseptically to large vessels or tanks. The medium in which the vegetative inoculum is produced can be the same as, or different from, that utilized for the production of the new compound, as long as it is such that a good growth of the microorganism is obtained.

The new compound of the invention is an amphoteric compound having the empirical formula $C_4H_7Cl_2NO_2$. It has a basic function of about pKa' 8.28. It is soluble in water and lower alkanols, e.g., methanol, ethanol, isopropanol, the butanols, and the like; it is relatively insoluble in chlorinated lower-alkanes, e.g., methylene chloride, chloroform, ethylene dichloride, and the like; lower-alkanones, e.g., acetone, methyl ethyl ketone, and the like; higher alcohols, and saturated hydrocarbon solvents.

A variety of procedures can be employed in the isolation and purification of armentomycin, for example, solvent extraction, liquid-liquid distribution in a Craig apparatus, the use of adsorbents, and crystallization from solvents.

In a preferred process, armentomycin is recovered from its culture medium by separation of the mycelia and undissolved solids by conventional means such as by filtration or centrifugation. The antibiotic is then removed from the filtered or centrifuged broth by the use of surface active adsorbents, for example, decolorizing carbon or decolorizing resins, and elution of the adsorbed material with a solvent. Any of the solvents mentioned above in which armentomycin is soluble, can be used. A suitable decolorizing resin is Permutit DR (U.S. Patent 2,702,263). The eluates obtained from the surface active adsorbent can be evaporated to dryness to provide an impure preparation of the antibiotic armentomycin. This preparation can be used in environments where higher purity of the antibiotic is not necessary.

High purity armentomycin can be obtained by subjecting an impure dry preparation of armentomycin, as obtained above, to liquid-liquid distribution in a Craig apparatus. Prior to the use of the craig apparatus, the dry preparation can be leached with a lower-alkanol; methanol is preferred.

The counter-current distribution in a Craig apparatus can be performed using a solvent system consisting of equal amounts of n-butanol and water. Active fractions obtained from the Craig apparatus can be concentrated to an aqueous solution and then freeze-dried. This material can then be obtained as crystalline armentomycin from a solution of a lower-alkanol (ethanol preferred) and water.

The new compound of the invention also can be purified by successive transfers from protonated to non-protonated forms and vice-versa, especially with other types of treatments intervening as, for example, solvent extractions and washings, chromatography, and fractional liquid-liquid extraction. In this manner, salts of armentomycin can be employed to isolate or upgrade the antibiotic. For example, the antibiotic can be converted to an insoluble salt, such as the picrate, which can be subjected to purification procedures and then used to regenerate the antibiotic. Or the antobiotic can be converted to a water-soluble salt, such as the hydrochloride or sulfate, and the aqueous solution of the salt extracted with various water-immiscible solvents before regenerating the antibiotic.

Since armentomycin is an amphoteric substance, it forms salts with acids, alkali metals, alkaline earth metals, and amines. Metal salts can be prepared by dissolving armentomycin in water, adding a dilute metal base until the pH of the solution is about 7 to 8, and freeze-drying the solution to provide a dried residue consisting of the armentomycin metal salt. Armentomycin metal salts include the sodium, potassium, and calcium salts. Amine salts of armentomycin, including those with organic bases such as primary, secondary, and tertiary mono-, di-, and polyamines can also be formed using the above-described or other commonly employed procedures. Other salts are obtained with therapeutically effective bases which impart additional therapeutic effects thereto. Such bases are, for example, the purine bases such as theophyllin, theobromin, caffeine, or derivatives of such purine bases; antihistaminic bases which are capable of forming salts with weak acids; pyridine compounds such as nicotinic acid amide, isonicotinic acid hydrazide, and the like, phenylalkylamines such as adrenalin, ephedrin, and the like; choline, and others.

Acid salts of armentomycin can be made by neutralizing armentomycin with the appropriate acid to below about pH 7.0, and advantageously to about pH 2 to pH 6. Suitable acids for this purpose include hydrochloric, sulfuric, phosphoric, acetic, succinic, citric, lactic, maleic, fumaric, pamoic, cholic, palmitic, mucic, camphoric, glutaric, glycolic, phthalic, tartaric, lauric, stearic, salicyclic, 3-phenylsalicyclic, 5-phenylsalicyclic, 3-methylglutaric, ortho-sulfobenzoic, cyclohexanesulfamic, cyclopentanepropionic, 1,2-cyclohexanedicarboxylic, 4-cyclohexenecarboxylic, octadecenylsuccinic, octenylsuccinic, methanesulfonic, benzenesulfonic, helianthic, Reineck's, dimethyldithiocarbamic, sorbic, monochloroacetic, undecylenic, 4'-hydroxyazobenzene - 4 - sulfonic, octadecylsulfuric, picric, benzoic, cinnamic, and like acids. Acid and base salts of armentomycin can be used for the same biological purposes as the parent compound.

The new compound of the invention can also be recovered from the filtered beer by adsorption on cation exchange resins. Both the carboxylic and sulfonic acid types can be used. [Suitable carboxylic acid resins include the polyacrylic acid resins obtained by the copolymerization of acrylic acid and divinylbenzene by the procedure given on page 87 of Kunin, Ion Exchange Resins, 2d ed. (1958), John Wiley and Sons, Inc. Carboxylic acid cation exchange resins of this type are marketed under the trade names Amberlite IRC–50 and Zeokarb 226. Suitable sulfonic acid resins include nuclear sulfonated polystyrene resins cross-linked with divinylbenzene obtained by the procedure given on page 84 of Kunin, supra. Sulfonated cation exchange resins of this type are marketed under the trade names Dowex–50, Amberlite IR–120, Nalcite HCR, Chempro C–20, Permutit Q, and Zeokarb 225.]

The antibiotic is eluted from the resin with water at an acid pH, advantageously at a pH lower than the pKa' of the cation exchange resin used. Satisfactory results are obtained with a pH of about 1 to 6. The excess acid in the eluate is neutralized to about pH 7.5 to 8.5 with a base, e.g., sodium hydroxide, or a strongly basic anion exchange resin, and the antibiotic is extracted with a solvent according to the process described above.

Alternatively, armentomycin can be separated from the culture medium by use of a strongly basic anion exchange resin. [Suitable anion exchange resins for this purpose are obtained by chloromethylating by the procedure given on pages 88 and 97 of Kunin, Ion Exchange Resins, 2d ed. (1958), John Wiley and Sons, Inc. polystyrene cross-linked, if desired, with divinylbenzene, prepared by the procedure given on page 84 of Kunin, supra, and quaternizing with trimethylamine or dimethylethanolamine by the procedure given on page 97 of Kunin, supra. Anion exchange resins of this type are marketed under the trade names Dowex–1, Dowex–2, Dowex–3, Amberlite IRA–400, Duolite A–102, and Permutit S–1.]

The new compound of the invention, armentomycin, is active against *Proteus mirabilis* and can be used to minimize or prevent odors caused by this organism in paper mill systems. It can also be used in poultry processing plants to control infections by the organism *Salmonella gallinarum*.

The following examples are illustrative of the process and products of the present invention but are not to be construed as limiting. All percentages are by weight and all solvent mixture proportions are by volume unless otherwise noted.

EXAMPLE 1

A. Fermentation

A soil stock of *Streptomyces armentosus* var. *armentosus* nov. sp., NRRL 3176, was used to inoculate 500 ml. Erlenmeyer flasks containing 100 ml. of sterile pre-seed medium consisting of the following ingredients:

|  | G. |
|---|---|
| Glucose monohydrate | 25 |
| Pharmamedia [1] | 25 |
| Tap water q.s., 1 liter. | |

[1] Pharmamedia is an industrial grade of cottonseed flour produced by Trader's Oil Mill Company, Fort Worth, Tex.

The pre-seed medium pre-sterilization pH was 7.2. The pre-seed inoculum was grown for 2 days at 28° C. on a Gump rotary shaker operating at 260 r.p.m.

The pre-seed inoculum (100 ml.) was used to inoculate a 40-liter seed tank containing 20 liters of the following sterile seed medium:

| | |
|---|---|
| Glucose monohydrate | g./liter__ 10 |
| Corn steep liquor | g./liter__ 10 |
| Pharmamedia | g./liter__ 2 |
| Wilson's Peptone Liquor No. 159 [2] | g./liter__ 10 |
| Lard oil | ml./liter__ 2 |
| Tap water | Balance |

[2] Wilson's Peptone Liquor No. 159 is a preparation of enzymatically hydrolyzed proteins of animal origin.

The pre-sterilization pH of the seed tank medium was 7.2. The seed inoculum was grown for 24 hours at a temperature of 25° C. with aeration at the rate of 10 standard liters per minute and stirring at the rate of 400 r.p.m.

A portion of the seed tank inoculum (12.5 liters), described above, was then used to inoculate a 400-liter fermentor containing 250 liters of the following sterile fermentation medium:

| | |
|---|---|
| Starch | g./liter__ 30 |
| Black strap molasses | g./liter__ 20 |
| Pharmamedia | g./liter__ 15 |
| Fish meal | g./liter__ 15 |
| Lard oil | ml./liter__ 5 |
| Tap water | Balance |

The pre-sterilization pH of the fermentation tank medium was 7.2. The fermentation cycle was 4 days during which time the temperature was controlled at 25° C., filtered air was supplied at a rate of 100 standard liters per minute, and agitation was at the rate of 280 r.p.m. Sterile lard oil was added to control foaming. Pre-harvest *P. mirabilis* assay was 213 biounits per ml. The weight of the whole broth was 263 kg.

B. Extraction

The whole broth from the above described fermentation was slurried with 7% of its weight of diatomaceous earth and filtered. The filtered beer (286 liters) was concentrated in vacuo to a beer volume of 47 liters. After being stirred with 2.5 kg. of activated carbon for 45 minutes, the beer was filtered with the aid of diatomaceous earth. Acetone was added to the filtrate with agitation. The resultant precipitate was removed by filtration with the aid of 3.5 kg. of diatomaceous earth. The acetone filtrate (250 liters) was concentrated to an aqueous and freeze-dried to yield 1991 g. of crude armentomycin assaying 12 biounits per mg. against *P. mirabilis*.

C. Purification

Two hundred grams (200 g.) of armentomycin, obtained as above, was leached with 1200 ml. of absolute methanol in a Waring blender for 10 minutes. The mixture was filtered and the insoluble material was discarded. The filtrate (1000 ml.) was mixed with 5 volumes of acetone (5000 ml.), and the preciptate which formed was separated by filtration and discarded. The remaining filtrate was concentrated to dryness to give 22.6 g. of armentomycin. This material was further purified by counter-current distribution as described below.

(1) *First counter-current distribution.*—The solvent system used consisted of equal amounts of n-butanol and water. The starting material, 10 g. of armentomycin from Part C, was dissolved in the lower phase of the above system (200 ml.) and this was introduced into an all-glass Craig counter-current apparatus (20 tubes). Upper phase, 200 ml. of equal amounts of n-butanol and water, was added and the distribution was carried out for 1000 transfers.

The following pools were made:

| Pool: | Tubes |
|---|---|
| I | 20–40 |
| II | 41–60 |
| III | 61–80 |
| IV | 81–120 |
| V | 121–210 |
| VI | 211–260 |

Each pool was concentrated to dryness by first concentrating to an aqueous solution in vacuo and then freeze-dying. Freeze-dried preparations from pools I to V were found to be inactive by the *P. mirabilis* assay. All the activity was found to be in the freeze-dried preparation (480 mg.) made from pool VI.

A similar counter-current distribution using 12 g. of starting material obtained in the same manner as in Part C above, yielded 870 mg. of an active preparation of armentomycin.

These two preparations (480 mg. and 870 mg.) of armentomycin were combined and dissolved, with heating, in 125 ml. of absolute methanol and 7 ml. of water. The clear solution was stored at 5° C. for 24 hours, after which crystalline armentomycin which precipitated was separated by filtration and dried; yield, 400 mg. of armentomycin.

(2) *Second counter-current distribution.*—In order to determine the purity of the above crystalline armentomycin, this preparation was distributed in a Craig counter-current distribution apparatus (2 ml./phase) using equal amounts of n-butanol:water as the solvent system. After 1000 transfers, tubes 181 to 245 were combined. The solution was concentrated to an aqueous and freeze-dried; yield, 300 mg. of armentomycin. This preparation was recrystallized from 25 ml. of absolute ethanol and 2.2 ml. of water; yield, 250 mg. of crystalline armentomycin.

The *Proteus mirabilis* assay used throughout this application is a microbiological disc plate assay on synthetic agar adjusted to a pH of 7.0. The synthetic agar used is made by Baltimore Biological Laboratories, Baltimore, Md. It is designated "Upjohn Mineral Salts Agar." It has the following ingredients:

| | G./liter |
|---|---|
| Monopotassium phosphate | 3 |
| Dipotassium phosphate | 7 |
| Magnesium sulfate | 0.1 |
| Ammonium sulfate | 1.0 |
| Sodium citrate | 1.0 |
| Agar | 15 |

27.1 g. of the above medium are used per liter of distilled water. The discs used are standard 12.7 mm. discs to which 0.08 ml. of test solution is applied. A biounit gives a 20 mm. zone of inhibition.

*Chemical and physical properties of armentomycin*

Elemental analyses: Calculated for $C_4H_7Cl_2NO_2$: C, 27.93; H, 4.10; N, 8.14; Cl, 41.23; O, 18.60. Found: C, 28.39; H, 4.44; N, 9.09; Cl, 40.60; O, 17.48 (by difference).
Calculated molecular weight: 172
Equivalent weight: 168 (titration with KOH) 174 (in acetic acid solution, using perchloric acid as titrant)
Titration: $pKa'$ of 8.28
Ultraviolet spectrum: Armentomycin does not show any maxima between 220 and 400 mu.
Infrared spectrum: The infrared absorption spectrum of armentomycin suspended in Nujol mull is reproduced in FIG. 1 of the drawing. Armentomycin shows peaks at the following wave lengths expressed in reciprocal centimeters:

| | |
|---|---|
| 3060 (S) | 1362 (M) |
| 2990 (S) | 1357 (S) |
| 2950 (S) | 1328 (M) |
| 2920 (S) | 1272 (M) |
| 2850 (S) | 1225 (M) |
| 2740 (M) | 1215 (W) |
| 2610 (M) | 1195 (W) |
| 2585 (M) | 1188 (W) |
| 2470 (W) | 1162 (W) |
| 2085 (W) | 1150 (M) |
| 1612 (S) | 1037 (M) |
| 1588 (S) | 1022 (W) |
| 1562 (S) | 971 (W) |
| 1553 (S) | 955 (W) |
| 1509 (S) | 914 (W) |
| 1503 (S) | 855 (M) |
| 1437 (S) | 785 (M) |
| 1417 (S) | 760 (W) |
| 1410 (W) | 675 (W) |
| 1375 (M) | 642 (S) |

Band intensities are indicated as: "S," "M," and "W," respectively, and are approximated in terms of the backgrounds in the vicinity of the band. An "S" band is of the same order of intensity as the strongest in the spectrum; "M" bands are between ⅓ and ⅔ as intense as the strongest band, and "W" bands are less than ⅓ as intense as the strongest band. These estimates are made on the basis of a percent transmission scale.

Optical rotation:
$[\alpha]_D^{25} = +6.7°$ (c. 0.74, water).
$[\alpha]_D^{25} = +26.24°$ (c. 0.74, pH 1, water).
Solubility: Armentomycin is soluble in water and lower alcohols, e.g., methanol and ethanol. It is relatively insoluble in less polar solvents, higher alcohols, alkanones, chlorinated hydrocarbons and saturated hydrocarbon solvents.

Papergram: The paper chromatographic pattern of armentomycin in the following solvent systems is as shown in FIG. 2 of the drawing:

I—1-butanol, water (84:16), 16 hours.
II—1-butanol, water (84:16), plus 0.25% p-toluenesulfonic acid, 16 hours.
III—1-butanol, acetic acid, water (2:1:1), 16 hours.
IV—2% piperidine (v./v.) in n-butanol, water (84:16), 16 hours.
V—1-butanol, water (4:96), 5 hours.
VI—1-butanol, water (4:96), plus 0.25% p-toluenesulfonic acid, 5 hours.

We claim:

1. An antibiotic assaying at least 213 biounits/ml. of armentomycin, a compound which
   (a) is effective in inhibiting the growth of Gram-negative bacteria; and in its essentially pure crystalline form
   (b) is soluble in water, methanol, and ethanol; and relatively insoluble in methylene chloride;
   (c) has the following elemental analyses: C, 28.39; H, 4.44; N, 9.09; Cl, 40.60; O, 17.48 (by difference);
   (d) has a calculated molecular weight of 172;
   (e) has no ultraviolet absorption maxima between 220 and 400 mu;
   (f) has an optical rotation $[\alpha]_D^{25} = +6.7°$ (c. 0.74, water) and $[\alpha]_D^{25} = +26.24°$ (c. 0.74, pH 1, water);
   (g) has a pKa' of 8.28; and
   (h) has a characteristic infrared absorption spectrum as shown in FIG. 1 of the accompanying drawing.

2. A compound as defined in claim 1, armentomycin, in its essentially pure form.

3. A compound as defined in claim 1, armentomycin, in its essentially pure crystalline form.

4. A compound selected from the group consisting of armentomycin, according to claim 1, and salts thereof with alkali metals, alkaline earth metals, and amines.

5. Acid-addition salts of armentomycin, the compound defined in claim 1.

6. A process which comprises cultivating an armentomycin-producing strain of *Streptomyces armentosus* var. *armentosus* nov. sp. in an aqueous nutrient medium under aerobic conditions until substantial activity is imparted to said medium by the production of armentomycin.

7. A process which comprises cultivating an armentomycin-producing strain of *Streptomyces armentosus* var. *armentosus* nov. sp. in an aqueous nutrient medium containing a source of assimilable carbohydrate and assimilable nitrogen under aerobic conditions until substantial activity is imparted to said medium by the production of armentomycin and isolating the armentomycin so produced.

8. A process according to claim 7 in which the isolation comprises filtering the medium, adsorbing the armentomycin on a surface active agent, and recovering armentomycin from the adsorbent.

References Cited

UNITED STATES PATENTS 3,067,099  12/1962  McCormick et al. ____ 167—65

ALBERT T. MEYERS, *Primary Examiner.*

D. M. STEPHENS, *Assistant Examiner.*